(12) United States Patent
Clements et al.

(10) Patent No.: US 10,496,670 B1
(45) Date of Patent: Dec. 3, 2019

(54) COMPUTER STORAGE DEDUPLICATION

(75) Inventors: Austin Clements, Arlington, MA (US); Irfan Ahmad, Mountain View, CA (US); Jinyuan Li, Mountain View, CA (US); Murali Vilayannur, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/783,392

(22) Filed: May 19, 2010

Related U.S. Application Data

(63) Continuation of application No. 12/356,921, filed on Jan. 21, 2009.

(60) Provisional application No. 61/179,612, filed on May 19, 2009.

(51) Int. Cl.
*G06F 17/30* (2006.01)
*G06F 16/27* (2019.01)
*G06F 16/31* (2019.01)

(52) U.S. Cl.
CPC .......... *G06F 16/273* (2019.01); *G06F 16/325* (2019.01)

(58) Field of Classification Search
CPC .............................. G06F 16/273; G06F 16/325
USPC ................................................. 707/610, 661
See application file for complete search history.

(56) References Cited

U.S. PATENT DOCUMENTS

| | | | |
|---|---|---|---|
| 5,584,005 A * | 12/1996 | Miyaoku | G06F 12/0292 711/206 |
| 6,075,938 A | 6/2000 | Bugnion et al. | |
| 6,591,269 B1 * | 7/2003 | Ponnekanti | G06F 17/30327 |
| 6,789,156 B1 | 9/2004 | Waldspurger | |
| 6,792,432 B1 * | 9/2004 | Kodavalla | G06F 17/30348 |
| 6,934,880 B2 | 8/2005 | Hofner | |
| 7,275,097 B2 * | 9/2007 | Peake, Jr. | G06F 11/3485 707/999.001 |
| 7,287,131 B1 | 10/2007 | Martin et al. | |
| 7,567,188 B1 * | 7/2009 | Anglin | G06F 3/0608 341/63 |
| 7,734,603 B1 | 6/2010 | McManis | |
| 7,747,584 B1 * | 6/2010 | Jernigan, IV | G06F 17/30156 707/692 |

(Continued)

FOREIGN PATENT DOCUMENTS

WO    WO 9940702 A1 *   8/1999   .......... H04L 9/3236

OTHER PUBLICATIONS

William J. Bolosky et al., "Single Instance Storage in Windows 2000", Microsoft Research, USENIX Technical Program, Aug. 2000 pp. 1-12.

(Continued)

*Primary Examiner* — Mark D Featherstone
*Assistant Examiner* — Navneet Gmahl
(74) *Attorney, Agent, or Firm* — Patterson + Sheridan, LLP

(57) ABSTRACT

Decentralized deduplication operations in a computer system employ a hash index that is a variant of a B+ tree to support both efficient sequential updates as well as efficient random updates. Sequential update is selected when deduplication is infrequently performed, such as on the order of days, and random update is selected when deduplication is performed more frequently, such as on the order of seconds. More frequent deduplication may be beneficial during periods when large amounts of temporary duplicate data are created, and the system may not have enough storage space to accommodate the temporary spike in demand.

17 Claims, 13 Drawing Sheets

(56) References Cited

U.S. PATENT DOCUMENTS

| | | | |
|---|---|---|---|
| 7,822,939 B1* | 10/2010 | Veprinsky | G06F 3/0608 711/161 |
| 7,840,537 B2 | 11/2010 | Gokhale et al. | |
| 7,921,077 B2* | 4/2011 | Ting et al. | 707/610 |
| 8,099,571 B1* | 1/2012 | Driscoll et al. | 711/162 |
| 8,135,930 B1 | 3/2012 | Mattox et al. | |
| 8,190,835 B1* | 5/2012 | Yueh | G06F 3/0608 711/162 |
| 8,266,152 B2* | 9/2012 | Millett | G06F 17/30333 707/711 |
| 9,002,800 B1* | 4/2015 | Yueh | G06F 12/145 707/661 |
| 2002/0087500 A1* | 7/2002 | Berkowitz | G06F 17/30348 |
| 2002/0103983 A1* | 8/2002 | Rege | G06F 11/1471 711/162 |
| 2003/0037022 A1 | 2/2003 | Adya et al. | |
| 2004/0107225 A1 | 6/2004 | Rudoff | |
| 2005/0033933 A1 | 2/2005 | Hetrick et al. | |
| 2005/0083862 A1 | 4/2005 | Kongalath | |
| 2005/0228802 A1* | 10/2005 | Kezuka | G06F 3/0605 |
| 2005/0240966 A1* | 10/2005 | Hindle | H04N 21/2358 725/45 |
| 2006/0085433 A1* | 4/2006 | Bacon | G06F 12/0253 |
| 2006/0230082 A1* | 10/2006 | Jasrasaria | G06F 11/2074 |
| 2007/0050423 A1* | 3/2007 | Whalen et al. | 707/200 |
| 2007/0061487 A1* | 3/2007 | Moore et al. | 709/246 |
| 2007/0239806 A1* | 10/2007 | Glover | G06F 11/1435 |
| 2007/0260815 A1 | 11/2007 | Guha et al. | |
| 2007/0294496 A1* | 12/2007 | Goss | G06F 12/1408 711/163 |
| 2008/0005141 A1* | 1/2008 | Zheng et al. | 707/101 |
| 2008/0010370 A1* | 1/2008 | Peake, Jr. | G06F 11/3485 709/223 |
| 2008/0059726 A1 | 3/2008 | Rozas et al. | |
| 2008/0111716 A1* | 5/2008 | Artan | G06F 17/30949 341/50 |
| 2008/0215796 A1 | 9/2008 | Lam et al. | |
| 2008/0294696 A1* | 11/2008 | Frandzel | G06F 3/0608 |
| 2009/0063795 A1 | 3/2009 | Yueh | |
| 2009/0070518 A1* | 3/2009 | Traister | G06F 12/0246 711/103 |
| 2009/0171888 A1 | 7/2009 | Anglin | |
| 2009/0204636 A1* | 8/2009 | Li | G06F 17/30097 |
| 2009/0234795 A1* | 9/2009 | Haas | G06F 17/30507 |
| 2009/0254609 A1 | 10/2009 | Wideman | |
| 2009/0271454 A1* | 10/2009 | Anglin | G06F 11/1453 |
| 2009/0287901 A1 | 11/2009 | Abali | |
| 2009/0307184 A1* | 12/2009 | Inouye | G06F 17/30333 |
| 2010/0042790 A1 | 2/2010 | Mondal et al. | |
| 2010/0057750 A1 | 3/2010 | Aasted et al. | |
| 2010/0070725 A1* | 3/2010 | Prahlad et al. | 711/162 |
| 2010/0174714 A1* | 7/2010 | Asmundsson | G06F 17/30327 707/737 |
| 2010/0257181 A1* | 10/2010 | Zhou | G06F 17/30336 707/747 |
| 2011/0131390 A1* | 6/2011 | Srinivasan | G06F 3/0622 711/209 |
| 2012/0096008 A1* | 4/2012 | Inouye | G06F 17/30333 707/743 |
| 2013/0332660 A1* | 12/2013 | Talagala | G06F 12/0246 711/103 |

OTHER PUBLICATIONS

John R. Douceur et al., "Reclaiming Space from Duplicate Files in a Serverless Distributed File System", Microsoft Research, Microsoft Corporation, Jul. 2002 Technical Report MSR-TR-2002-30, pp. 1-14.

Bo Hong et al., "Duplicate Data Elimination in a SAN File System", (2004) pp. 101-114.

Koller et al., "I/O Deduplication: Utilizing Content Similarity to Improve I/O Performance," Proceedings of FAST '10: 8th USENIX Conference on File and Storage Technologies, Feb. 26, 2010, pp. 211-224.

Milos, et al., "Satori: Enlightened Page Sharing," Proceedings of 2009 USENIX Technical Conference, Jun. 17, 2009. Also available at <http://www.usenix.org/event/usenix09/tech/full_papers/milos/milos_html/index.html>, visited Aug. 5, 2010.

Sean Quinlan et al., "Venti: a new approach to archival storage", USENIX Association, Proceedings of the FAST 2002 Conference on File and Storage Technologies; Monterey, CA, US, Jan. 28-30, 2002, pp. 1-14.

Benjamin Zhu et al., "Avoiding the Disk Bottleneck in the Data Domain Deduplication File System", USENIX Association, FAST '08: 6th USENIX Conference on File and Storage Technologies, pp. 269-282.

Distributed Computing, Webopedia.com, Apr. 10, 2001.

* cited by examiner

COMPUTER STORAGE DEDUPLICATION

CROSS-REFERENCE TO RELATED APPLICATIONS

This application is a continuation-in-part of U.S. patent application Ser. No. 12/356,921, filed Jan. 21, 2009, which claims the benefit of U.S. Provisional Patent Application Ser. No. 61/096,258, filed Sep. 11, 2008. This application also claims the benefit of U.S. Provisional Patent Application Ser. No. 61/179,612, filed May 19, 2009. The entire contents of these applications are incorporated by reference herein.

BACKGROUND

Typical computer file systems store file data in small, fixed-size blocks, referred to by pointers maintained in metadata associated with each file. In the event two pointers refer to identical blocks, some storage capacity can be reclaimed by changing one or both pointers so that they refer to the same block. The process of finding pointers that refer to identical blocks and then changing one or both pointers so that they point to the same block is referred to herein as "deduplication". Such deduplication is typically performed by a gateway that controls access by host computers to the storage medium.

SUMMARY

In one of its aspects, the present invention provides a data center comprising plural computer hosts and a storage system external to said hosts, said storage system including storage blocks for storing tangibly encoded data blocks, each of said hosts including a host operating system with an deduplicating file system driver installed. The file system driver, referred to through the specification and drawings simply as "file system", identifies identical data blocks stored in respective storage blocks. The file system merges such identical data blocks into a single storage block so that a first file exclusively accessed by a first host and a second file accessed exclusively by a second host concurrently refer to the same storage block.

In another of its aspects, the present invention provides a manufacture comprising computer-readable storage media encoded with a file system of computer-executable instructions. The file system, when executed on a host computer system, connects to a storage system managing files, including a shared-block file, encoded in said storage system. The files contain tangibly encoded metadata pointers referring to storage blocks containing tangibly encoded data blocks, said shared-block file having metadata pointers referring to blocks referred to by plural of said metadata pointers, said file system including a write-log handler for updating a hash index having a shared set of entries referring to shared storage blocks indirectly through said shared-block file, and having an unshared set of entries referring to unshared storage blocks indirectly through said files other than said shared-block file, said hash index being tangibly encoded in said storage system.

In another aspect, the invention provides a method comprising a first file system executing on a first host computer system, said first file system managing a first write operation to a first file on a storage system by writing a first data block to a first storage block of said storage system and causing a first metadata pointer of said first file to refer to said first storage block, a second file system executing on a second host computer system managing a second write operation to a second file on a storage system by writing second contents to a second block of said storage system and causing a second metadata pointer of said second file to refer to said second block, and said second file manager determining whether or not said second contents are identical to said first contents, if said second contents are identical to said first contents, said second file manager causing said second metadata pointer to refer to said first block.

In still another aspect, the invention provides a method of performing deduplication operations in a computer system having multiple host systems connected to a common storage system, the method comprising the steps of maintaining a hierarchical data structure including a low-level data structure and one or more higher level data structures, and at each host system, tracking write operations to the common storage system during a period of time and asynchronously performing deduplication operations on storage blocks that are written in connection with the write operations using the hierarchical data structure.

Further embodiments of the invention include a computer system and a computer readable medium in which instructions for the computer system are stored. The computer includes a plurality of host systems connected to a common storage system, wherein each host system is programmed to track write operations to the common storage system during a period of time and asynchronously performing deduplication operations on storage blocks that are written in connection with the write operations using a hierarchical data structure that is stored in the common storage system and includes a low-level data structure and one or more higher level data structures. The instructions stored in the computer readable medium cause the computer system to maintain a hierarchical data structure including a low-level data structure and one or more higher level data structures, and to track write operations to a storage system during a period of time and asynchronously perform deduplication operations on storage blocks that are written in connection with the write operations using the hierarchical data structure.

BRIEF DESCRIPTION OF THE DRAWINGS

FIG. 2 emphasizes steps associated with write operations.

FIG. 5 emphasizes steps relating to finding a match between a write record and a hash-index entry.

FIG. 6 emphasizes steps relating to handling matches that refer to mutable block pointers. These steps can include issuing merge requests.

FIG. 7 emphasizes merge-request handling steps of the method of FIG. 2.

FIG. 8 emphasizes steps relating to handling matches that refer to copy-on-write block pointers.

FIG. 9 emphasizes purge steps of the method of FIG. 2.

DETAILED DESCRIPTION

Figure 1:
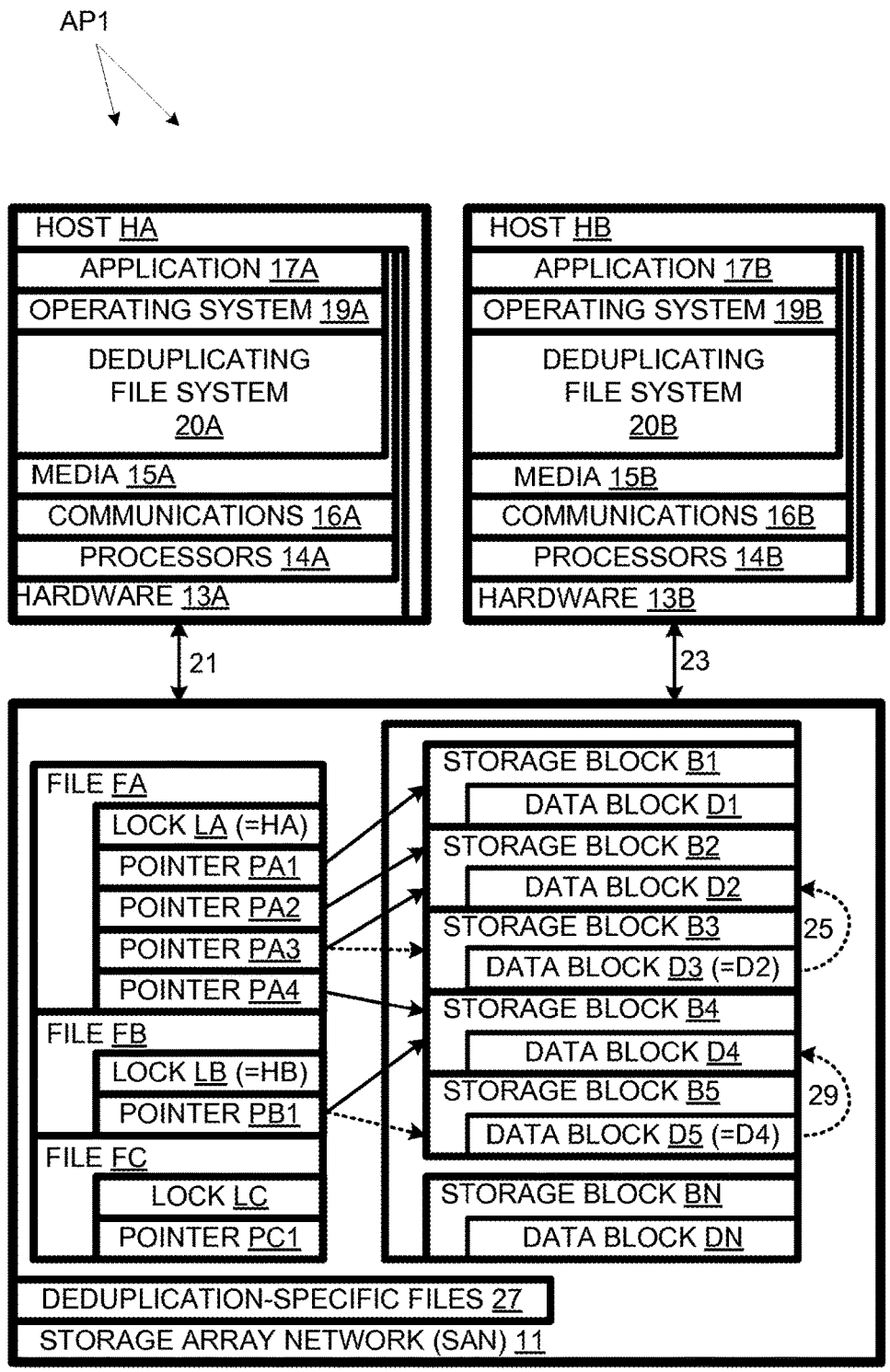
FIG. 1 is a schematic diagram of a data center in accordance with an embodiment of the invention.

A data center AP1 embodying the present invention is depicted in FIG. 1. Data center AP1 includes hosts HA and HB and a storage system in the form of a storage array network (SAN) 11. Host HA includes hardware 13A, including processors 14A, media 15A, and communications devices 16A. Computer-readable storage media 15A is encoded with programs of computer-executable instructions including an application 17A, an operating system (OS) 19A, and a deduplicating file system 20A. Herein, "media" refers to tangible computer-readable storage media, a type of manufacture. "Media" encompasses hard disks, optical disks, and solid-state memory devices. Application 17A runs on operating system 19A, which accesses SAN 11 using file system 20A. Host HB analogously includes hardware 13B, processors 14B, media 15B, communications devices 16B, application 17B, operating system 19B, and deduplicating file system 20B.

As those skilled in the art will surmise, the invention provides for a great variety of data-center and other computer-system topologies. The invention provides for data centers with any number of hosts and the hosts can vary from each other, e.g., in the power and type of hardware involved, the number and types of applications and operating systems run, and schemes for networking the hosts. For example, using virtual-machine technology, one host can run several applications on respective operating systems, all sharing the same file system.

Applications 17A and 17B and operating systems 19A and 19B store data in files such as files FA, FB, and FC. File systems 20A and 20B divide the data into fixed-size blocks, 4 kB in this embodiment, and store it as data blocks D1-DN in respective storage blocks B1-BN. A file is associated with its contents by metadata block pointers. For example, file FA includes a block pointer PA1 that is associated with an offset location within file FA. Block pointer PA1 refers to storage block B1, which contains data block D1. (Note: the dashed arrows represent prior associations between pointers and blocks, while the solid arrows represent current associations between pointers and blocks.) A file typically has many pointers, and more than one of those can refer to a given storage block; for example, file FA includes pointers PA2 and PA3, both of which refer to storage block B2. It is also possible for two pointers from different files to point to the same block; for example, pointer PA4 of file FA and pointer PB1 of file FB both refer to storage block B4.

As indicated by two-way arrows 21 and 23, communications with SAN 11 by hosts HA and HB are largely independent. To prevent conflicting file accesses, hosts HA and HB are prevented from concurrently accessing the same file. To this end, each file includes a lock that can be owned by a host. Although a file can be accessed by at most one host any given time, hosts HA and HB can time-share (access at different times) a file, e.g., file FC, by releasing and acquiring locks. For mnemonic and expository purposes, two files are treated herein as "permanently" owned by respective hosts: host HA permanently owns lock LA, so host HB can never access file FA; likewise, host HB permanently owns lock LB, so host HA can never access file FB. "Permanently" here means "for the entire duration discussed herein".

In data center AP1, deduplication is decentralized. Each host HA, HB has its own deduplicating file system 20A, 20B. There are several advantages over a centralized approach. No specialized hardware is required to handle deduplication. There is no central host that might become a bottleneck or a single-point of failure for data center AP1. Furthermore, the present invention scales conveniently as adding more hosts inherently contributes more resources to the deduplication function.

Deduplication can be effected according to the following example. Prior to deduplication, pointer PA2 referred to storage block B2, and thus to data block D2, while pointer PA3 referred to storage block B3 and thus to data block D3. During a deduplication operation 25, it is determined that data block D3 is equivalent to data block D2. Data block D3 is then effectively merged with data block D2 in storage block B2 by changing block pointer PA3 so that it refers to storage block B2. Storage block B3 is thus freed for another use. Deduplication operation 25 was executed by host HA, while it had exclusive access to file FA, which includes as metadata all block pointers involved in operation 25.

However, the present invention does not require one host to have access to both files involved in a deduplication operation. For example, host HA can discover that storage block B5 and storage block B4 are likely to contain equivalent data blocks even though no file that host HA has access to refers to storage block B5. This discovery of likely equivalence can be made through deduplication-specific files 27. Host HA can record this likely equivalence by issuing a merge request and storing it in one of deduplication-specific files 27. Once host HB can obtain access to the merge request, host HB can determine whether the proposed equivalence is valid and, if so, and change block pointer PB1 (which host HB has access to) to point to storage block B4 to effect deduplication operation 29. Thus, although acting independently, hosts HA and HB can cooperatively implement deduplication by time-sharing deduplication-specific files 27

Due to the large numbers of storage blocks typically handled by a storage system, it is not practicable to compare every possible pair of blocks for possible duplicates. However, since new duplicates only (or at least primarily) arise in the context of write operations, deduplication candidates can be identified by tracking write operations. In an embodiment of the invention, each block is checked for possible matches as part of the write operation. However, the illustrated embodiment monitors write operations but defers deduplication to a time when demand on computing resources is relatively low to minimize any performance penalty to applications 17A and 17B.

Write Operations

Figure 2:
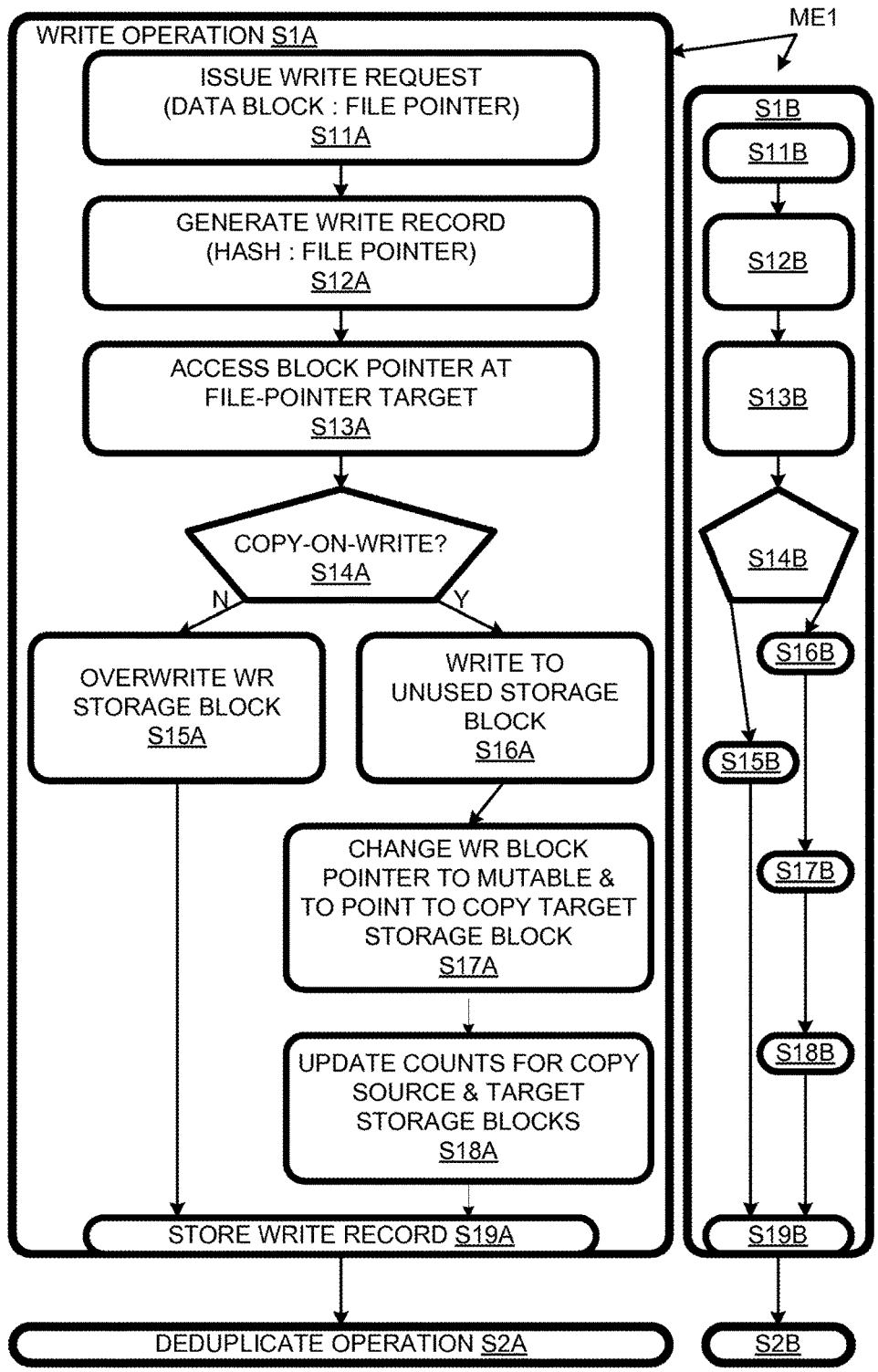
FIG. 2 is a flow chart of a method in accordance with an embodiment of the invention.

Thus, in a method ME1, as flow-charted in FIG. 2, file system 20A monitors write operations originating on host HA during a write operation S1A and later performs a deduplication operation S2A. File system 20A stores information on SAN 11 in 4-kilobyte (4 kB) blocks. (As explained further below, file system 20A uses both one-megabyte (1 MB) and 4 kB blocks in a hierarchical fashion.)

At step S11A, application 17A initiates a write operation, e.g., of data to file FA. The write operation involves writing data to a location with a file stored on SAN 11. Write operations initiated by application 17A may be: 1) confined to a single block; or 2) encompass multiple blocks or at least cross a block boundary. In the latter case, file system 20A breaks the write operations into single-block suboperations, each of which are treated as described below for a single-block write operation. Similarly, the range of write addresses asserted by application 17A is converted to file pointers. Each file pointer specifies a file identifier (file ID) and an offset value (indicating a location within the specified file). Associated with each such file location is metadata defining a block pointer that refers to a 4 kB storage block (B1-BN).

At step S12A, file system 20A detects the write operation and generates a write record. In the process, file system 20A generates a hash of the data block and associates it with the file pointer derived from the write request. In the illustrated embodiment, a write record is only generated for write operations in which an entire block is overwritten. No write record and no ensuing deduplication occurs in response to a write of a partial block. In an alternative embodiment, in the case where a write operation involves only a portion of a block, the remainder of the block must be read in to generate the hash. File system 20A uses an SHA-1 algorithm that generates 160-bit hashes, also known as "fingerprints", "signatures", and "digests", so comparisons are between 20-byte values as opposed to 4 kB values. Two blocks with different hashes are necessarily different. SHA-1 hashes are collision resistant, so it is very unlikely that two blocks with the same hash will be different. To avoid any possibility of a mismatch, bit-wise comparisons of the full blocks can optionally be used to confirm a match indicated by a comparison of hashes. SHA-1 hashes also have security-related cryptographic properties that make it hard to determine a block from its hash. Alternative embodiments use other hash algorithms, e.g., SHA-2, and MD5.

At step S13A, file system 20A accesses the block pointer referred to by the file pointer that file system 20A derived from the write address range specified by application 17A. Thus, for example, a write of block D4 to file FA and an offset associated with block pointer PA4, host HA would access block pointer PA4.

File systems 20A and 20B distinguish between copy-on-write (COW) block pointers and "mutable" block pointers. A mutable-type pointer indicates that the target storage block can be overwritten. A COW-type pointer indicates that the target storage block must not be overwritten. For example, a storage block such as B2 in FIG. 1 that is referred to by more than one block pointer (PA2 and PA3) normally should not be overwritten. Instead, its contents can be copied to a free storage block, which can then be overwritten without invalidating other pointers. In an alternative embodiment, storage block reference counts rather than pointer types determine whether or not a write can be performed in place.

At step S14A, file system 20A determines whether: 1) the write operation can be performed in place, i.e., the target block can be overwritten; or 2) the write operation must be performed on a copy of the target block, e.g., because other files referring to the block expect it to remain unchanged. In the illustrated embodiment, this determination is made by examining the COW vs. mutable type of the block pointer accessed in step S13A. If the pointer is mutable, the data block specified in the write operation overwrites the contents of the storage block referred to at step S15A. If the block pointer type is COW, a copy-on-write operation is performed and the data block is written to a free storage block at step S16A. The block pointer accessed in S13A is changed to refer to the new storage block at step S17A; its type remains "mutable". A storage-block reference count associated with the newly used storage block is incremented from "0" ("free") to "1" ("unique"), at step S18A. Also, at step S18A, a storage-block reference count associated with the copy-source block is decremented, as one fewer block pointer refers to it.

At step S19A, the write record generated in step S12A is transferred from host HA to SAN 11. Typically, write records accumulate at the host where they are organized by destination file. The write records are then transferred to write logs on SAN 11 for their respective files. The write records are subsequently used during deduplication operation S2A, typically scheduled for low utilization times, e.g., 2 am. Method ME1 analogously provides for steps S1B, S2B, and S11B-S19B for implementation by host HB.

Data Center Detail

Figure 3:
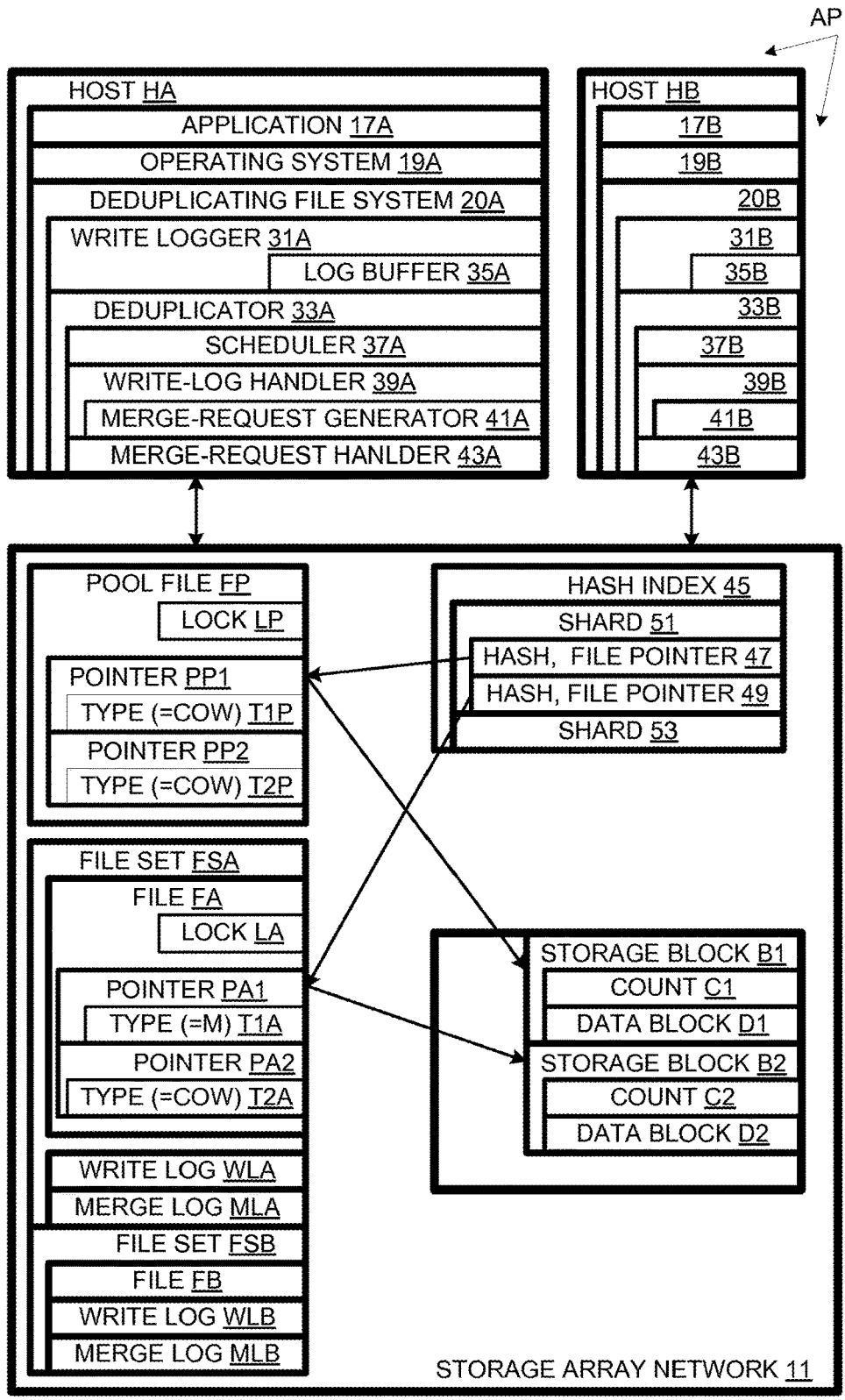
FIG. 3 is a more detailed schematic diagram of the data center of FIG. 1.

As shown in FIG. 3, file system 20A for host HA includes a write logger 31A and a deduplicator 33A. Write logger 31A generates write records and stores them temporarily in a log buffer 35A on host HA. Deduplicator 33A includes a scheduler 37A, a write-log handler 39A including a merge-request generator 41A, and a merge-request handler 43A. File system 20B of host HB analogously includes a write logger 31B with buffer 35B, a deduplicator 33B, a scheduler 37B, a write-log handler 39B with a merge-request generator 41B, and a merge-request handler 44B.

SAN11 includes storage blocks including blocks B1 and B2, file sets including file sets FSA and FSB, a hash index 45, and a shared-block or "pool" file FP. Hash index 45, pool file FP, write logs WLA and WLB, and merge logs MLA and MLB are examples of deduplication-specific files FS (FIG. 1). Each file set includes a "characteristic" file, e.g., file FA for file set FSA, and may also include an associated write log file, e.g., write log WLA, and/or an associated merge log file, e.g., merge log MLA. The "may" in the preceding sentence arises because: 1) where there is no write-record associated with the characteristic file, the file set does not include a write log file; and 2) if there are no merge requests associated with the characteristic file, the file set includes no merge log file. An alternative embodiment provides for empty write-log files and empty merge-log files.

Write logs, e.g., write logs WLA and WLB, and merge logs, e.g., merge log MLA and WLB, are files with structures analogous to characteristic files. In other words, their contents, including write records and merge requests, are arranged in data blocks that are, in turn, stored in storage blocks B1-BN. The write logs and merge logs include metadata block pointers that refer to the storage blocks that store the write records and merge requests. For expository purposes, the characteristic files (e.g., FA and FB) are considered herein in their physical aspect (e.g., with metadata block pointers), while ancillary files, e.g., write logs and merge logs, are considered herein in their logical aspect, i.e., with direct reference to contents.

Write logs WLA and WLB are written to when storing write records and read from when processing those records during deduplication. They are also read from to discover hash-index entries that can be purged. The ownership of write log files follows ownership of the associated main files. Thus, host HA, for example, has exclusive access to write log WLA as long as it has exclusive access to file FA.

All other deduplication-specific files are accessible from both hosts HA and HB on a time-share basis (i.e., at different times, both host HA and host HB have exclusive access to these deduplication-specific files), whether or not the associated main files are. For example, host HA can access merge-request log MLB on a time-share basis even though it cannot access file FB at all. This allows host HA to store a merge request for handling by host HB.

Figure 4:
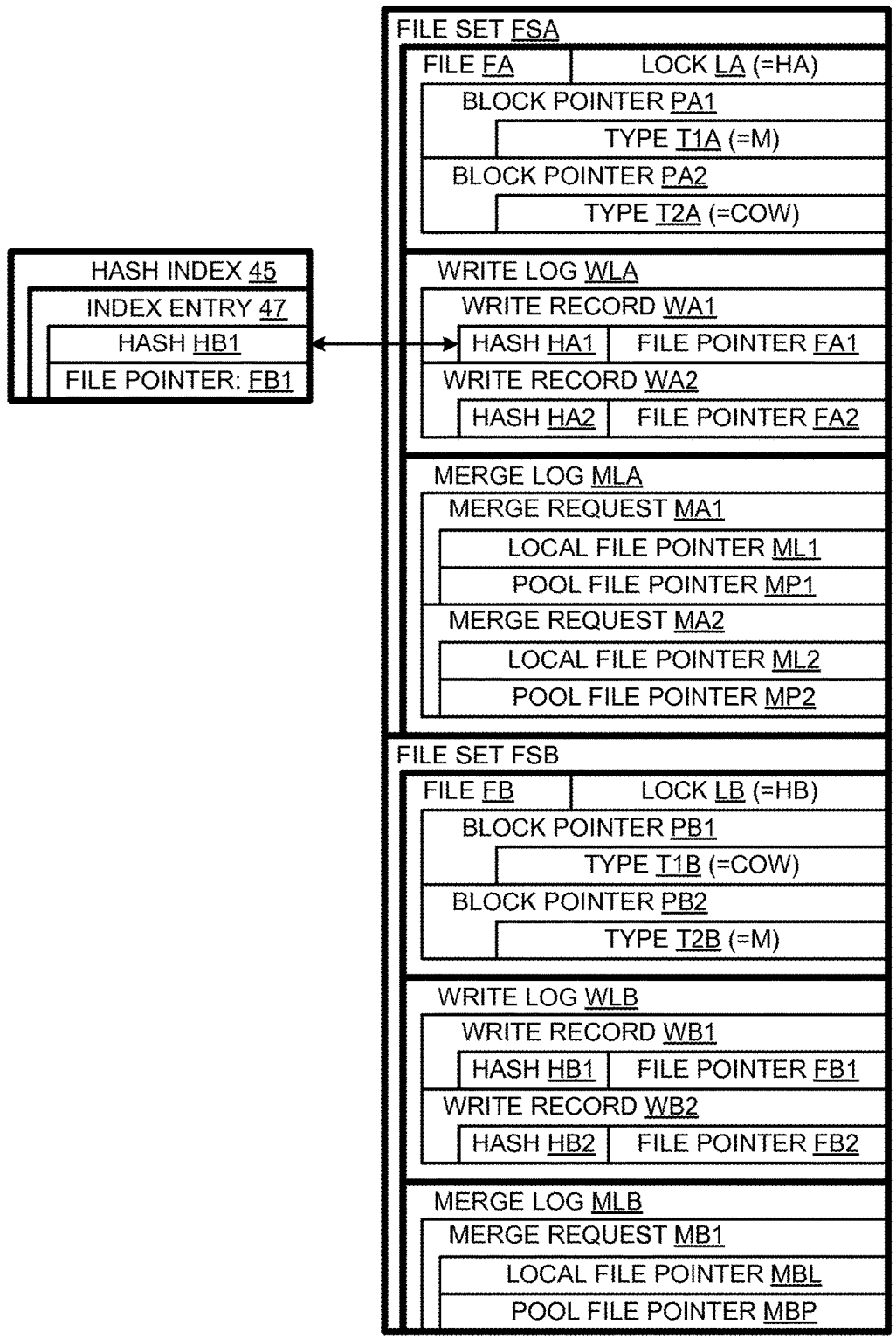
FIG. 4 is a schematic block diagram of a pair of file sets of the data center of FIG.

File sets FSA and FSB are shown in more detail in FIG. 4. In FIG. 4, for reasons given above, characteristic files FA and FB are represented in their physical aspect with block pointers, while ancillary files WLA, WLB, MLA, and MLB are presented in their logical aspect with contents. In particular, write log WLA includes write records WA1 and WA2, while write log WLB includes write records WB1 and WB2. Each write record WA1, WA2, WB1, WB2, includes a hash value HAL HA2, HB1, HB2, (corresponding to the data block that was written) and a file pointer FA1, FA2, FB1, FB2 (corresponding to the write destination from the perspective of operating systems 19A and 19B). The write logs serve to store records of write operations on a per-destination basis for subsequent deduplication processing.

Merge log MLA includes merge requests MA1 and MA2, while merge log MLB includes merge requests MB1 and MB2. Each merge request MA1, MA2, MB1 specifies two file pointers: a "local" file pointer ML1, ML2, MBL, and a "pool" file pointer MP1, MP2, MBP. The local file pointer refers to a location in the associated characteristic file. For example, local file pointer ML1 points to an offset within characteristic file FA. (Note that since each ancillary file (write log or merge log) is associated with only one characteristic file, the local file pointer need only specify explicitly an offset.) The pool file pointer refers to a location within pool file FP.

The local file pointers and pool file pointers refer directly to file locations with associated block pointers. Thus, the local file pointers and pool file pointers refer indirectly to storage blocks. In an alternative embodiment, a merge request includes the block pointer from the pool file instead of a pool-file block pointer. In other words, in the alternative embodiment, merge requests refer to storage blocks directly rather than indirectly through an intermediate file (e.g., FA or FB).

Hash index 45 serves, albeit on a delayed basis, as a master list of all used storage blocks. Hash index 45 includes entries 47, 49, etc., assigning hash values to file pointers. The file pointers refer to file locations associated with block pointers associated with storage blocks associated with data blocks that are represented by the hashes. In other words, hash index 45 indirectly indexes storage blocks by their contents.

Hash index 45 is divided into horizontal shards 51 and 53. Each shard covers a pre-determined range of hash values, e.g., shard 51 includes hash values beginning with "0" while shard 53 includes hash values beginning with "1". Dividing the hash index allows both hosts HA and HB to access respective shards concurrently and then switch so that each host has access to all entries. The number of shards into which a hash index is divided can be larger for greater numbers of hosts so that all or most hosts can access respective parts of the hash index concurrently.

In an alternative embodiment, each hash index is explicitly associated with a list of all file pointers that refer to respective block pointers to the same block. In the illustrated embodiment, only one file pointer is listed per hash value. For hash values that are associated with more than one block pointer, the associated file pointers points to a pool file location. A block pointer associated with that pool file location refers to the common block referenced by those block pointers.

Pool file FP, like other files FA and FB, includes a lock LP and block pointers PS1 and PS2. Basically, hash index entries, e.g., 47, 49 refer either to pool files or other files. Hash index entries that refer to pool file FP refer to COW-type block pointers, while hash index entries that refer to other files refer to mutable-type block pointers. The COW-type pointers refer to blocks that are or at least were shared; the mutable block-type pointers refer to blocks that are not shared. In an alternative embodiment, there is no pool file and a hash index entry lists all file pointers associated with shared blocks.

Finding a Match

Figure 5:
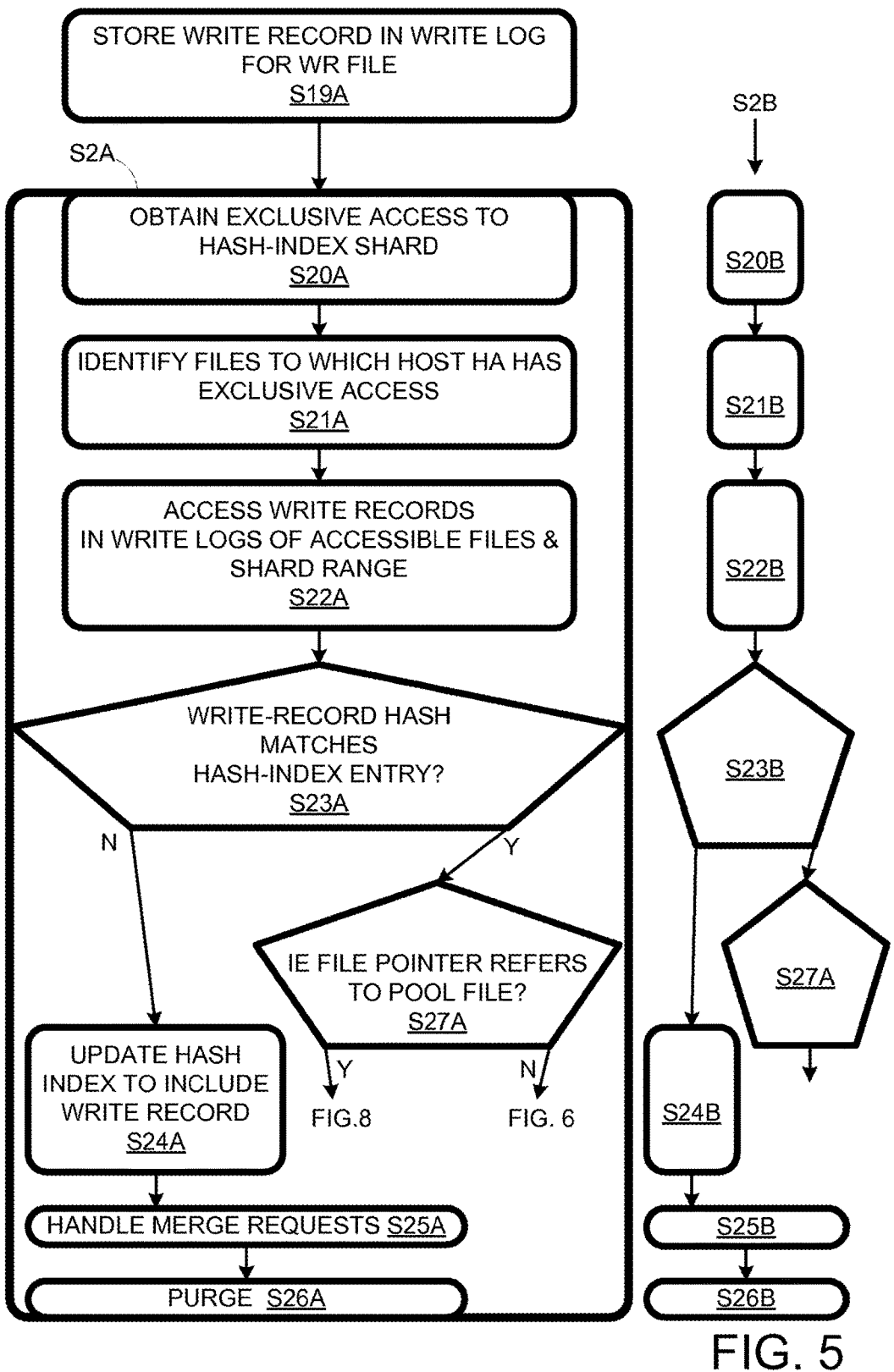
FIG. 5 is a flow chart of deduplication steps of the method of FIG. 2.

Before storage block contents can be merged, they must be determined to be identical. To this end, content hashes are compared; more specifically, the hash in a write record is compared to possibly matching hashes in hash index 45. Thus, as shown in FIG. 5, step S20A involves obtaining exclusive access to hash index 45 or at least one of its shards 51, 53. In one or more embodiments, after a hash match is found, content of the blocks are compared to prevent false matches.

At step S21A, file system 20A identifies files to which host HA has exclusive access, e.g., by checking locks. At step S22A, write-log handler 39A, accesses write records in write logs of accessible files; only those write records having hashes in the range of the accessed shard are processed until a different shard is accessed. In embodiments in which the hash index is not divided into shards, all accessible write records can be accessed. Even in embodiments in which hashes that are not broken down into shards, the hashes can be ordered so that only a fraction of the hash entries need to be checked to establish a "miss" (no matching index entry).

At step S23A, for each write record, a determination is made whether or not the hash in the record matches a hash value in hash index 45. If there is no match, then the data block corresponding to the write record is unique. No deduplication is possible; however, the hash index is updated at step S24A to include a new entry corresponding to the write record. The entry includes the hash value and the file pointer of the write record. This completes processing of the subject write record. The next steps are handling merge requests at step S25A and purging deduplication-specific files FD. These two steps are discussed further below.

If, at step S23A, a match is found, then the file pointer associated with that hash in the hash index is accessed at step S27A. Referring to FIG. 4, hash HA1 of write record WA1 matches hash HB1 of index entry 47. A write record matches an index entry when their hashes are equal. It is not necessary and it is not likely that write-record file pointer FA1 would match index entry file pointer FB1. Note that steps S20A-S27A have host HB counterparts S20B-S27B.

Write-record file pointer FA1 specifies a file (file FA) and an offset in that file at which block pointer PA4 is located. Block pointer PA4 refers to storage block B4 that contains data block D4. Herein, "WR file", "WR offset", "WR block pointer", "WR storage block" and "WR data block" all refer to entities specified by or directly or indirectly referred to by a write record. Likewise, a prefix "IE" refers to entities specified by or referred to by an index entry file pointer in its original form. If an index entry file pointer has been revised, the prefix "RE" is used.

Match Points to Unique Storage Block

In effect, a write record that does not match any pre-existing index entries is itself entered into hash index 45. Initially, the new entry specifies the same file pointer (file and offset) that the write record specifies. This entry remains unchanged until it is matched by another write record. In the meantime, the IE file pointer refers to the original mutable-type WR block pointer that, in turn, refers to a WR storage block. However, since the WR block pointer is mutable, the WR data block may have been overwritten between the time the write record was generated and the time the match was recognized. In this case, the match between the WR hash and the IE hash is obsolete.

If the host processing the write record does not have access to the IE file, the host will not be able to determine whether or not the hash-index entry is obsolete. For example, if host HA is processing a write record for file FA and if that write record matches a hash-index entry that refers to file FB, host HA will, in effect, need the help of host HB if the validity of the index entry is to be determined. However, since hosts HA and HB access SAN 11 independently, this cooperation cannot depend on cooperative action. Instead, host HA makes its information available by copying its block pointer to pool file FP and transferring the rest of the deduplication task to host HB in the form of a merge request.

Figure 6:
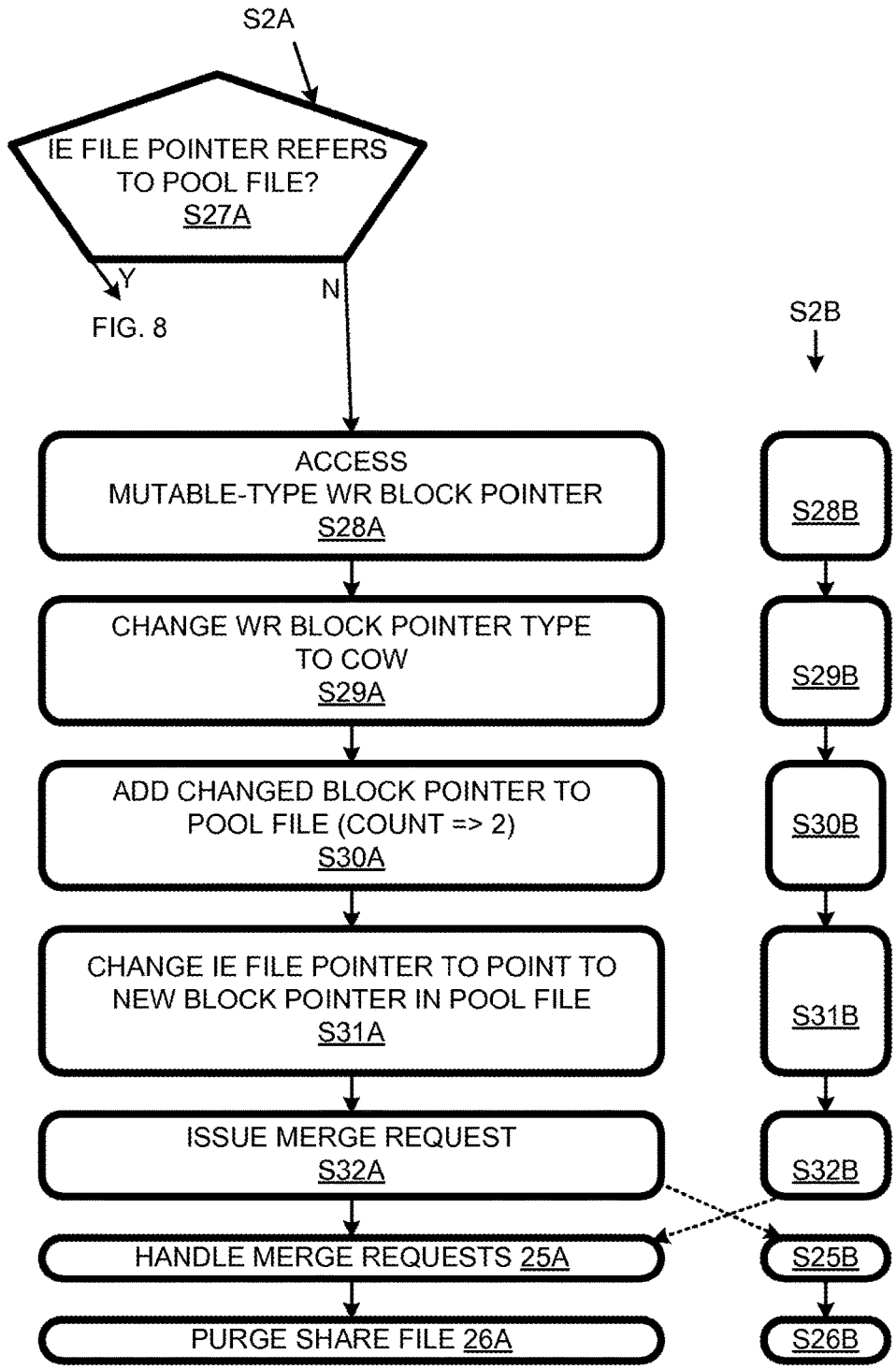
FIG. 6 is a flow chart of deduplication steps of the method of FIG. 2.

When, at step S27A, write-log handler 39A determines that the IE file is not pool file FP, method ME1 continues at step S28A, as shown in FIG. 6. While it may not have access to the IE file, the host processing a write record must have access to the WR file and WR mutable-type block pointer. This block pointer is accessed at step S28A.

At step S29A, the type of the WR block pointer is changed from "mutable" to "COW". At step S30A, this newly COW-type WR block pointer is added to pool file FP so that it is accessible by all hosts. Since the WR file and the pool file now share the WR storage block, its count is incremented to "2".

At step S31A, the IE file pointer is changed to refer to the pool file. (Note: it is this step that leads to the inference that an index entry that refers to a file other than pool file FP has not been matched previously.) This resulting revised-entry RE file pointer now points to the WR storage block. For example, if host HA is processing a write record referring through WR block pointer PA4 to WR storage block B4 (as shown in FIG. 1) and the index entry refers to IE block pointer PB1 which refers to IE storage block B5, step S31A causes the revised entry to refer through pool file FP4 to RE storage block B4 instead of IE storage block B5. Even if IE storage block B5 has been overwritten, the RE data block corresponds (at least at the time of the write operation represented by the write record) to the matching IE hash.

Since access to files is exclusive, the host processing a write request will not generally have access to IE block pointer. If the host cannot access the IE file, it cannot identify the IE storage block and cannot change the IE block pointer to match the one in the pool file (from step S30A). Accordingly, the host transfers responsibility for these tasks to a host with access to the IE file by issuing a merge request and storing it the merge log for the target file. For example, merge-request generator 41B can store a merge request in merge log MLB for handling by merge-request handler 43B of host HB at step S25B Likewise, merge request generator 41B of host HB can store merge requests in merge log MLA for handling by merge-request handler 43A of host HA at step S25A.

In an alternative embodiment, a host completes match determinations when it has access to the file referred to by the index entry. Thus, merge requests are only issued when the non-pool file referenced by an index entry is inaccessible to the host processing the write record.

Handling Merge Requests

Figure 7:
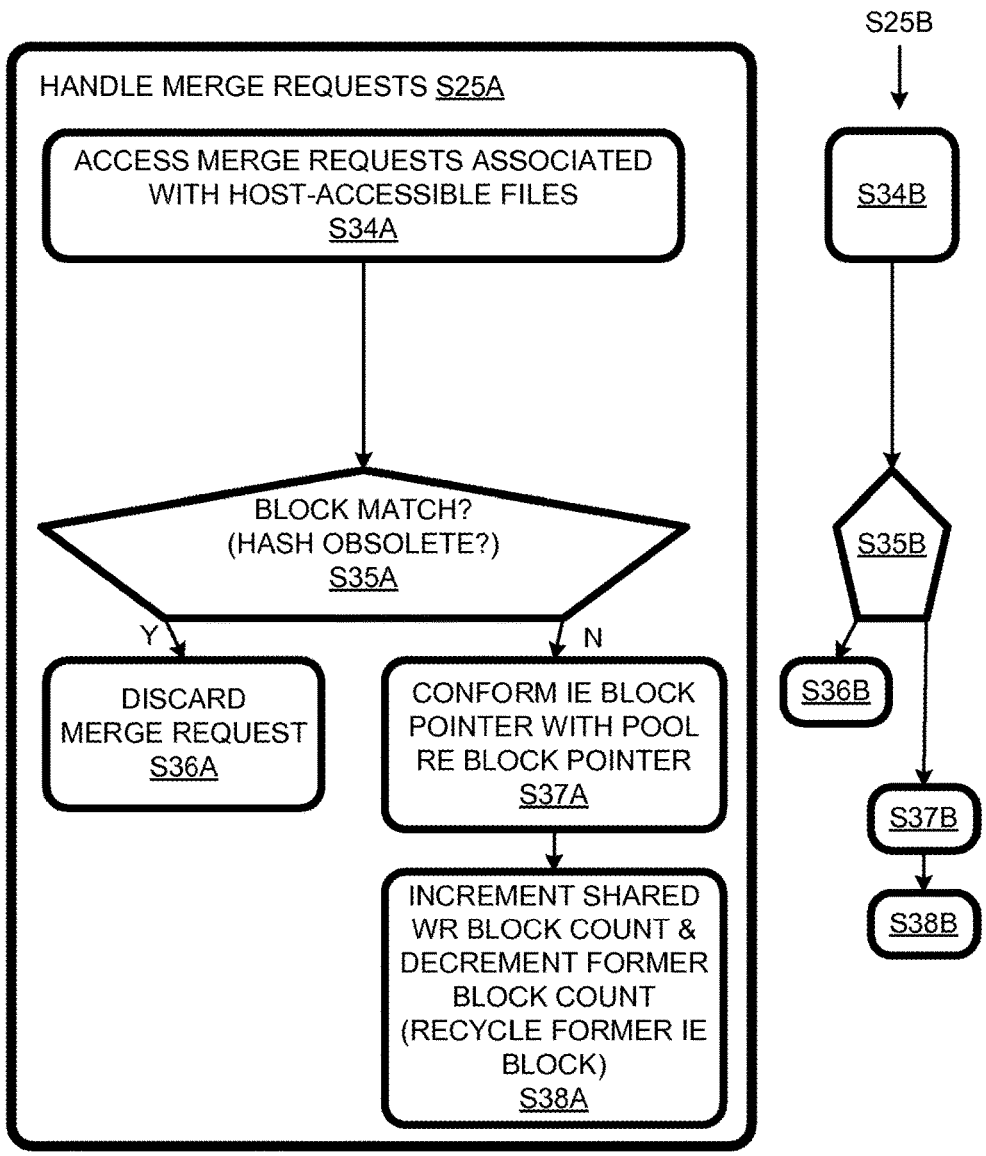
FIG. 7 is a flow chart of deduplication steps of the method of FIG. 2.

Steps S25A and S25B include several substeps, herein referred to as "steps", as shown in FIG. 7. At step S34B, host HB accesses the merge requests for files accessible to host HB. As shown in FIG. 4, a merge request specifies: 1) the IE file pointer, and 2) the RE block pointer in pool file FP. The RE block pointer refers to the WR storage block. The issue is whether the IE data block matches the WR/RE data block. At step S35B, the contents of the IE and RE blocks are compared, e.g., by generating and comparing their hashes.

If the comparison disconfirms the equality of the IE data block and the RE data block, host HB discards the merge request without performing any deduplication at step S36B. The IE block pointer and the IE storage block remain unchanged in response to the merge request. The WR storage block remains "shared" by pool file FP and the WR file. In an alternative embodiment, the hash index and the pool file revert to their respective states before processing of the write record that resulted in the merge request.

If the comparison at step S35B confirms the match, the IE block pointer in the exclusive file is conformed to the COW-type block pointer in the pool file at step S37B. At step S38B, block counts are adjusted. The IE storage block that had been referred to by one pointer is now referred to by zero, so its count is decremented from "1" to "0". The IE storage block referred to in the pool file has its count incremented from "2" to "3".

For example, if, in the course of processing a merge request, host HB determines that the contents of storage block B5 still correspond to the index-entry hash, pointer PB1 will be changed from pointing to storage block B5 to storage block 54, as in deduplication operation 29 of FIG. 1. This completes the portion of method ME1 dealing with handling a write record that matches a unique hash-index entry. Analogous method steps S33A-S38A are implemented by host HA.

Handling a Match that Refers to the Pool File

When a write record matches a unique index entry, the index entry is changed so that it refers to the pool file instead of its original file. In the illustrated embodiment, index entries do not change in the other direction. In an alternative embodiment, storage blocks referred to by the pool file and only one other block pointers revert back to having unique index entries and are treated in the same manner as an original unique entry.

Figure 8:
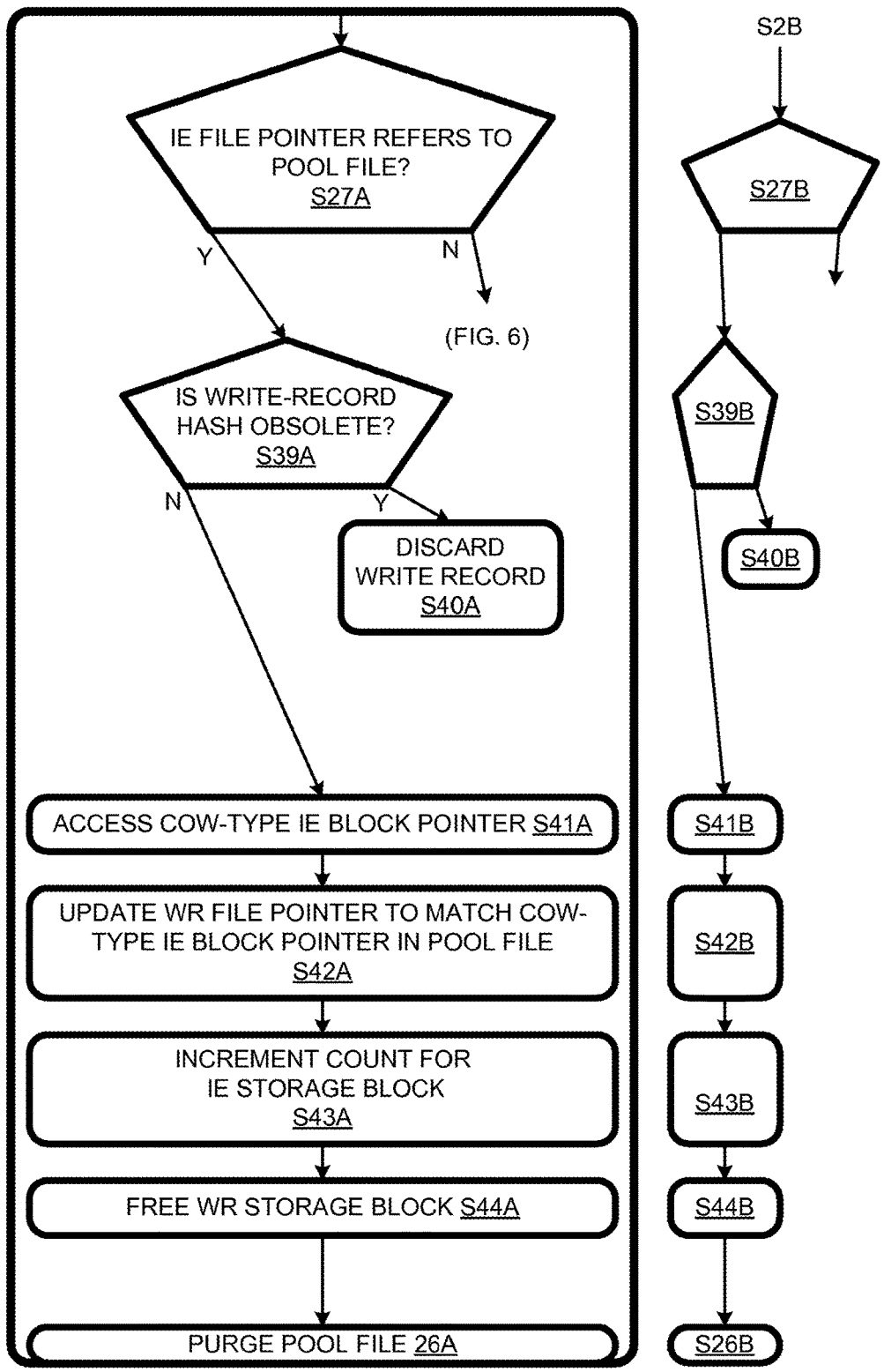
FIG. 8 is a flow chart of deduplication steps of the method of FIG. 2.

If at step S27A, the matching index entry refers initially to pool file FP, a new hash is generated from the contents of the WR storage block at step S39A, shown in FIG. 8. If the hashes do not match, the write record is discarded at step S40A. In this case, the hash index, block pointers, and block counts all remain unchanged.

If at step S39A, the match is confirmed (not obsolete), host HA accesses the IE block pointer in the pool file entry at step S41A. The WR block pointer is updated to match the IE block pointer in pool file FP at step S42A. At step S43A, the IE storage block count is incremented. At step S44A, the count for the WR storage block is decremented to zero, and that block is freed. Host HB can implement analogous steps S39B-S44B for handling matches to shared entries.

Purging

Figure 9:
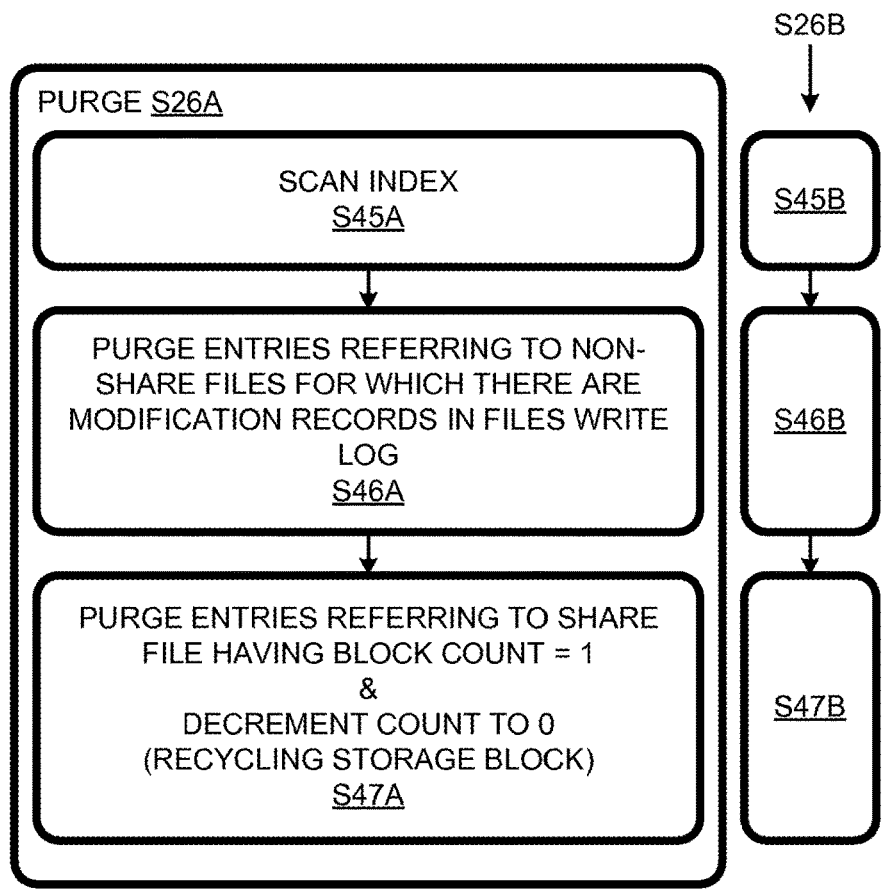
FIG. 9 is a flow chart of deduplication steps of the method of FIG. 2.

Purge steps S26A and S26B are flow charted in FIG. 9. When a free storage block is first written to, its count is incremented from "0" to "1". When that block becomes shared, its count is incremented twice: once due to a block pointer in the pool file, and once because it is referred to by a second block pointer in the same or a different characteristic file. Thus, the count jumps from "1" to "3".

Each attempt to overwrite the shared block yields a COW operation so that one less pointer refers to the original storage block; in this case, the count is decremented by one. Thus, a COW operation can drop a count from "3" to "2"; the next COW operation on that block can drop the count from "2" to "1", corresponding to the fact that only the pool file now points to the storage block. Since no other file points to that block, it can be freed by decrementing its counters to "0", and purges corresponding entries in the pool file and the index.

In addition, an unprocessed write log may indicate that a unique storage block has been overwritten. If, before that write log is processed, another write log matches the hash for the unique storage block, method ME1 will determine that there is no match. This effort can be avoided by simply purging unique index entries for which the file pointer matches the file pointer of an unprocessed write record.

Accordingly, purge method S26A involves host HA scanning hash index 45 at step S45A. Purging hash index entries with file pointers that match those of unprocessed write records at step S46A. At step S47A, hash index entries corresponding to shared blocks with a count of "1" are purged along with the referenced pool file entries. Also at this step, the referenced storage block is freed by setting its count to "0". Steps S45B-S47B are performed analogously by host HB.

Mixed File Block Size Support

In file systems, data is managed in blocks of some fixed size. For example, some commonly used file systems use 4 kilobyte blocks and some other file systems (e.g., VMware™ VMFS) use bigger blocks such as 1 megabyte blocks. Managing data in larger size blocks simplifies many read and write operations and reduces the amount of metadata needed to keep track of stored data. However, deduplication tends to be more effective when smaller blocks are used as the probability of finding two matching data blocks is higher.

Figure 10A:
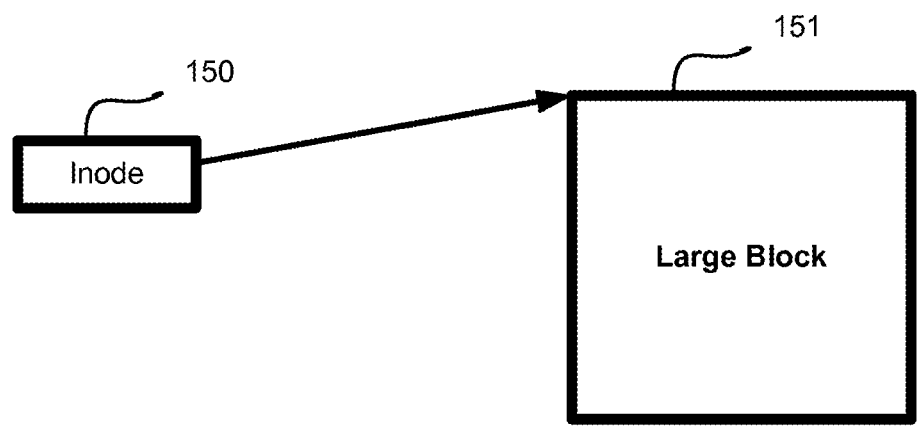
FIGS. 10A and 10B illustrate the use of a fragment pointer block to manage data blocks of large sizes.
Figure 10B:
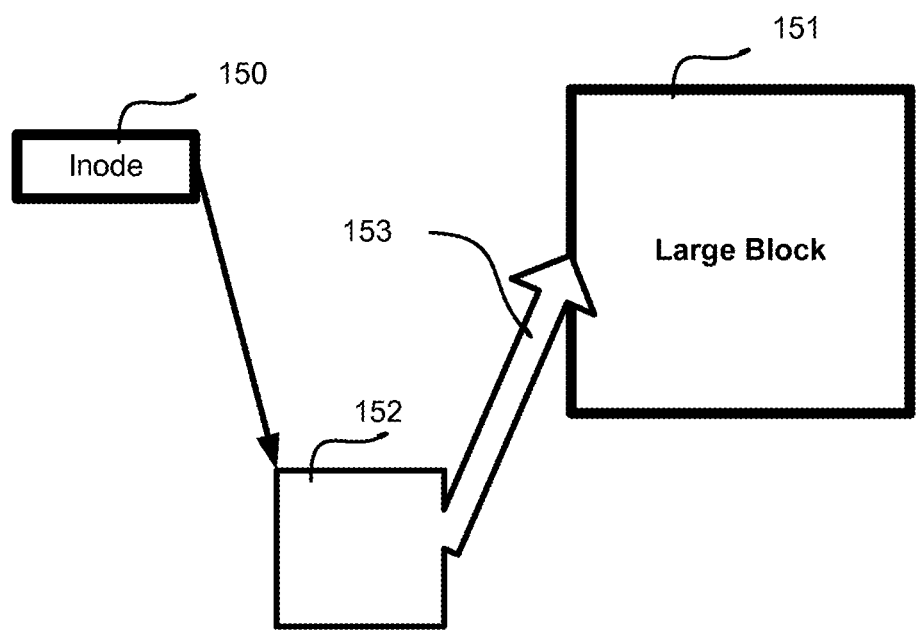

FIG. 10A illustrates a file inode 150 having a pointer to a large data block 151. Inode 150 may include a plurality of pointers, each pointing to a different large data block. Inode 150 is a data structure that is used to store file metadata. In one embodiment, as illustrated in FIG. 10B, a fragment pointer block 152 is introduced between inode 150 and the large data block 151. The fragment pointer block 152 includes pointers to small file blocks totaling up to the size of a large file block. That is, the large file block is logically divided into a number of smaller blocks. Pointers 153 to each of these smaller blocks are then stored in the fragment pointer block 152.

In one embodiment, to make the file system aware of this block fragmentation, a flag is stored in inode 150 to indicate that a pointer in inode 150 now points to a fragment pointer block. In one embodiment, this flag is stored in the pointer that points to the fragment pointer block. In this embodiment, if the flag is set to a particular state (e.g, yes or no or 0 or 1, etc.), the file system adjusts itself to manage multiple smaller blocks. In one example, consider a direct file whose inode consists of pointers to 1 megabyte file blocks. To individually address a 4 kilobyte block at an offset of 1032 kilobytes into the file, the second 1 megabyte block of the file is divided into 256 four kilobyte blocks. A fragment pointer block is allocated to store the pointer to the 256 small blocks and the pointer to the original 1 megabyte block is replaced with a pointer to the fragment pointer block.

Random Updates to Hash Index

The deduplication method according to embodiments of the invention operates out-of-band. Thus, there is a delay between when duplicate data blocks are written to storage blocks and when these duplicate data blocks are detected and reclaimed. Typically, the deduplication is carried out in batch once a day, during time of low hardware utilization, e.g., 2 am. Also, in order to improve batch performance, hash index 45 is maintained as a sorted, sequential file.

Another embodiment of the invention employs a hash index that is a variant of a B+ tree to support both efficient batch updates as well as efficient random updates. When performing deduplication using this hash index, the system can be configured to automatically select the faster way to update the index, either sequentially (which is likely when deduplication is infrequently performed, such as on the order of days) or randomly (which is likely when deduplication is performed more frequently, such as on the order of seconds).

More frequent deduplication may be beneficial during periods when large amounts of temporary duplicate data are created (situation known as "temporary file system bloat"), and the system may not have enough storage space to accommodate the temporary spike in demand. This may occur for example when hosts HA, HB are configured to run virtual machines and one or more new virtual machines are being instantiated in them.

Figure 11:
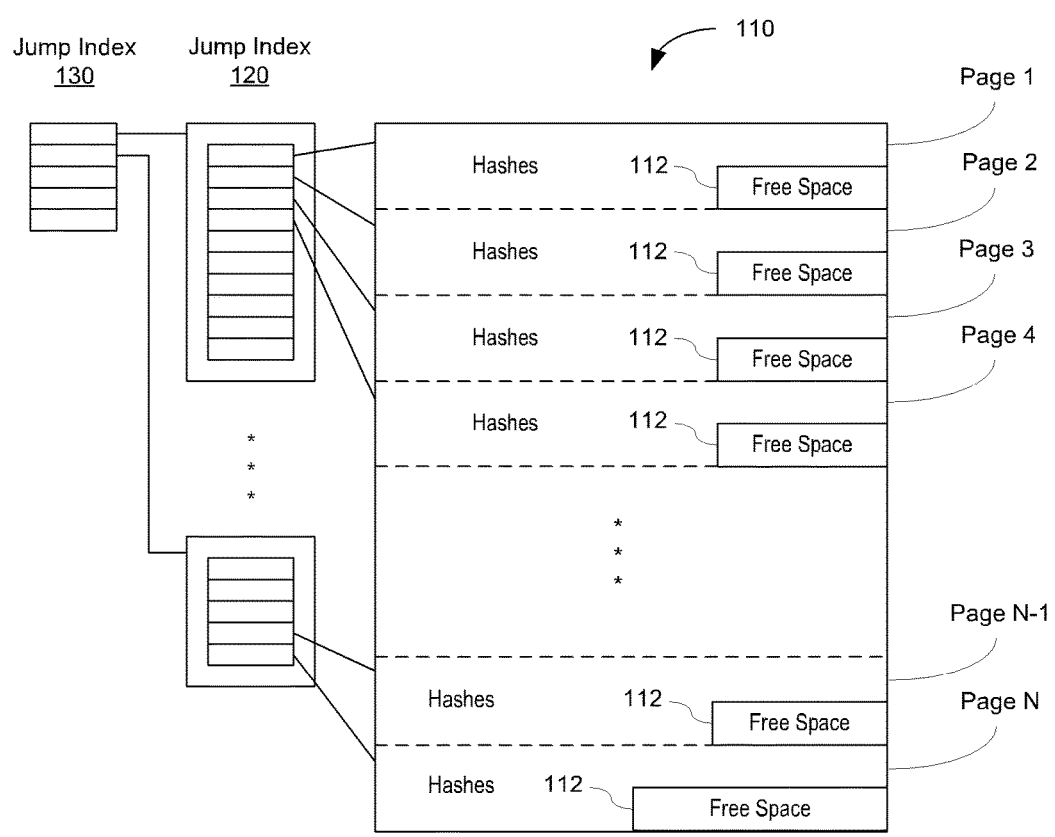
FIG. 11 is a conceptual diagram of a hash index that supports both sequential and random updates.

A conceptual diagram of the hash index that is a variant of a B+ tree is illustrated in FIG. 11. Hash index 110 replaces hash index 45 and differs from hash index 45 in the way it is maintained and updated. A host performing an update of hash index 110 (e.g., host HA or host HB) can perform a random update or a sequential update depending on how frequently it performs the updates. For example, if the frequency is less than a threshold time period, random update is performed. Otherwise, sequential update is performed. The threshold time period may be configured by the user or dynamically determined from IO metrics learned from previous index updates. In one embodiment, the configuration on how updates are performed and the threshold time period are customized on a per-file, per-host, or per-cluster basis.

Referring to FIG. 11, hash index 110 contains hashes and associated file pointers as in hash index 45, and is divided into fairly large pages (shown as Pages 1, 2, 3, 4, . . . , N). In the embodiment disclosed herein, the large page size is 64 kilobytes. However, the large page size can be greater or less than 64 kilobytes in other embodiments of the invention. At the end of each large page, a free space 112 is provided to support efficient random updates, the process for which is further described below. The size of this free space 112 can be increased or decreased based on observation on the efficiency of the random updates.

Another index, referred to herein as a jump index 120, is maintained at a higher level from hash index 110. One or more jump indices 120 (two are shown in FIG. 11) store the first hash of each large page and is sorted by hash. Additional jump indices 120 may be added as the number of large pages of hash index 110 that are tracked by jump indices 120 grows. When there are two or more jump indices 120 as shown in FIG. 11, another index, jump index 130, is maintained at a higher level from jump index 120. Additional jump indexes are created at higher levels until there is only a single topmost jump index. Given an update entry, jump indices 120, 130, etc. allow the update entry's page location within hash index 110 to be quickly determined. According to one or more embodiments of the invention, the data structure of jump indices 120, 130, etc. may be any data structure of a fixed size, e.g., a page, a large page, etc.

When performing a sequential update, the host first reads the entries of hash index 110 and its write log, and then updates hash index 110 in the same manner as hash index 45, except hash index 110 is divided into a plurality of large pages and free space 112 is provided at the end of each large page. When performing a random update, the host reads the entries in its write log and uses jump indices 120, 130, etc. to locate the large pages that need to be updated. If an update to a large page does not cause the large page to overflow, i.e., free space 112 is sufficient to absorb the new entries into hash index 110 resulting from the update, the large page is updated. If the update causes the large page to overflow, i.e., the size of the large page with the new entries is greater than the allocated large page size, the large page is split into equal halves, the first of which is written over the original large page and the second of which is appended to the end of hash index 110, and the jump indices are updated. A similar splitting of the jump indices may occur if the number of entries added to hash index 110 is large. To prevent this from occurring, in some embodiments, free space is also provided at the end of the data structure of the jump indices.

Figure 12A:
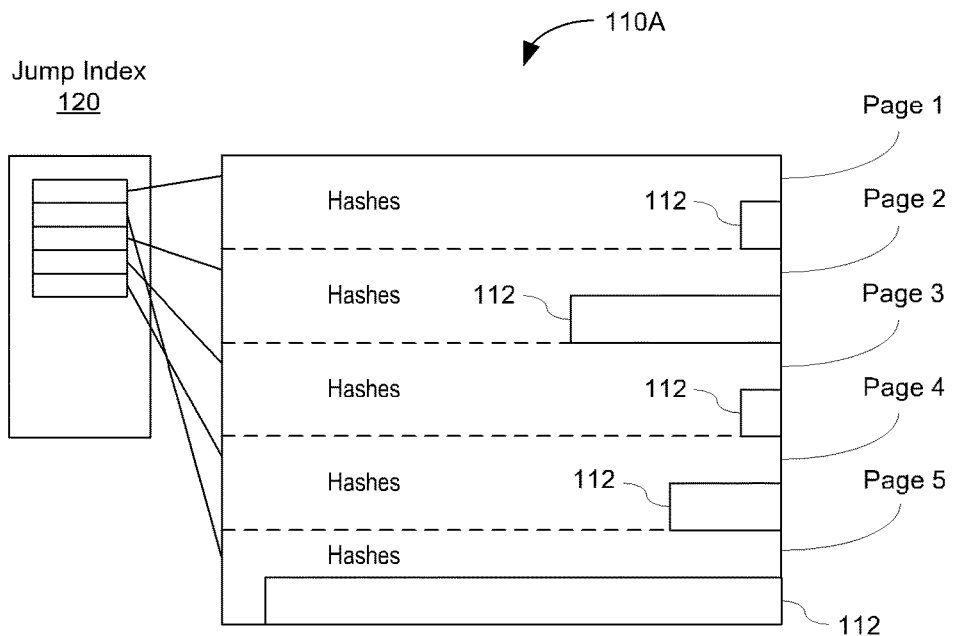
FIG. 12A illustrates the structure and contents of a sample hash index after random updates and prior to a sequential update.
Figure 12B:
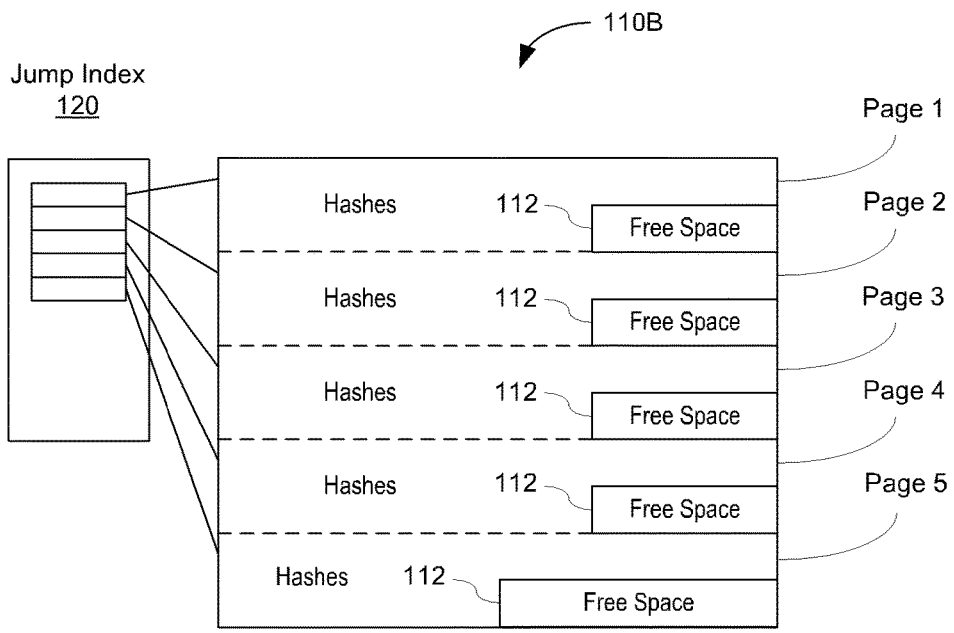
FIG. 12B illustrates the change in the structure and contents of the sample hash index of FIG. 12A after the sequential update.

FIG. 12A illustrates the structure and contents of a sample hash index, referred to as hash index 110A, after some random updates but prior to a sequential update. FIG. 12B illustrates how the structure and contents of the sample hash index are changed after the sequential update. The changed sample hash index is referred to as hash index 110B. As shown, hash index 110A is not completely sequential as indicated by how the first entry of the jump index 120 points to Page 1 but the second entry of jump index points to Page 5 instead of Page 2. Also, the size of the free space 112 in the pages of hash index 110A is not uniform as a result of new entries being written into different pages of hash index 110A. After sequential update is carried out, hash index 110B is completely sequential as indicated by how the first entry of the jump index 120 points to Page 1, the second entry to Page 2, the third entry to Page 3, and so forth. Also, the size of the free space 112 in the pages of hash index 110B is uniform, with the exception of the last page, Page 5. The last page shows a bigger size of the free space 112, because the end of hash index 110B does not necessarily coincide with the beginning of the free space 112.

Figure 13:
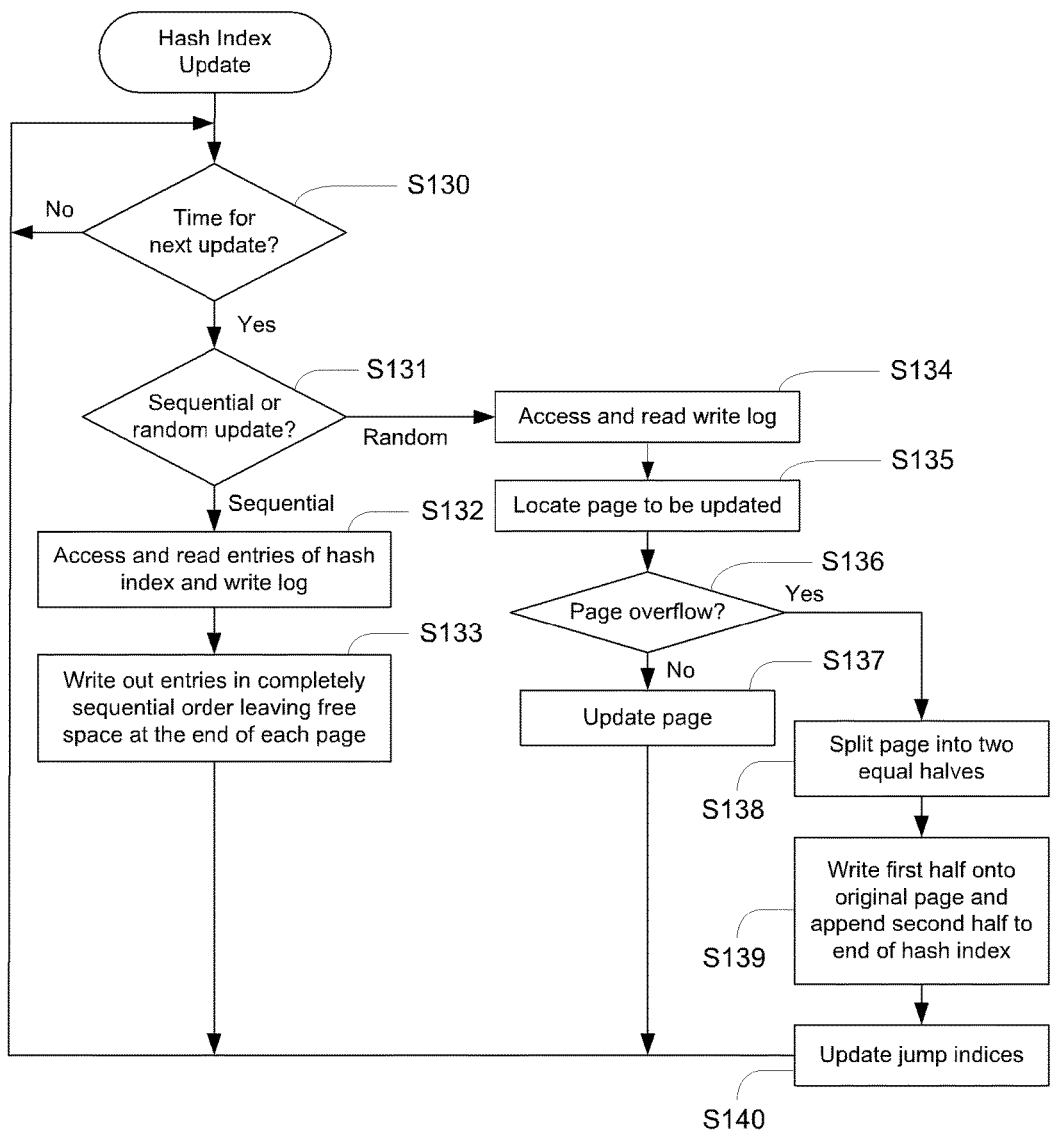
FIG. 13 is a flow chart of steps of a method of updating the hash index of FIG. 11.

FIG. 13 is a flow chart of steps of a method of updating the hash index of FIG. 11 with new entries from the write log. This method is carried out in each of the hosts HA, HB according to instructions stored in a computer readable storage medium and executed by a processor of the respective host. The method carried out by one of the hosts HA, HB is described below. The method carried out by the other host is substantially the same.

Prior to the start of this method, a time period for updates is specified and stored. This time period can be specified on a per-file, per-host, or per-cluster basis. In the example given here, the time period is specified for the host. At step S130, the host determines if the time for a next update has been reached. If so, the flow proceeds to step S131. At step S131, a selection is made between sequential update or random update. In one embodiment, if the time period for updates is greater than or equal to a threshold time period, sequential update is carried out (steps S132-S133). Otherwise, random update is carried out (steps S134-S140). The threshold time period can be configured by the user or dynamically determined from IO metrics learned from previous index updates.

At step S132, the first step of sequential update, the host accesses the hash index of FIG. 11 and its write log, and reads the entries of the hash index and the write log. Then, at step S133, the host updates the hash index by writing out the entries that were read in completely sequential order, leaving free space of a predetermined and configurable size at the end of each large page (e.g., 64 kilobytes). The free space size can be configured by the operator or dynamically by the host based on observation on the efficiency of the random updates. After step S133, the flow returns to step S130.

At step S134, the first step of random update, the host accesses its write log and reads the entries of the write log. Then, steps S134-S140 are carried out for each entry in the write log. At step S135, the host examines the jump indices of the hash index to locate the large pages that need to be updated for each entry in the write log. Overflow of the large page is determined at step S135. If the update does not cause the large page to overflow, the large page is updated (step S136). However, if the update causes the large page to overflow, the large page is split into equal halves (step S137). After the split, at step S138, the first half of the large page is written over the original large page and the second half of the large page is appended to the end of the hash index. At step S139, the jump indices are updated. After steps S136 and S139, the flow returns to step S130.

Herein, a "hash" index is a file or other data structure that associates (directly or indirectly) hashes with the (present or past) storage-block locations of data blocks used to generate or that otherwise correspond to the hashes. Herein, a "shared-block file" or "pool file" (elsewhere referred to as an "arena") is a file with pointers that refer (directly or indirectly) to storage blocks that are know to be or have been shared by different locations within the same file and/or by different files. In the illustrated embodiment, a hash-index entry can refer indirectly to a shared storage block by referring directly to a pool-file location having an associated metadata block pointer that refers directly to the shared storage block.

In an alternative embodiment, each file with redirected file pointers has a corresponding hidden file that indicates which parts of the file are being shared and refer off to a special pool-like file. All reads and writes go through a filter layer that is aware of these hidden files. The combination of the underlying file system and this filter layer is functionally equivalent to the illustrated file system that supports pointer rewriting and COW. In effect, the filter system serves as a file system that uses another file system as its storage medium instead of using the disk directly. These and other variations upon and modifications to the illustrated embodiment are provided by the present invention, the scope of which is defined by the following claims.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript™, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows™, Apple Mac™, Unix/X-Windows™, Linux™, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

We claim:

1. A method of performing deduplication operations in a computer system having multiple host systems connected to a common storage system, the method comprising:
    maintaining a hierarchical data structure including a low-level data structure and one or more higher level data structures, each containing hash values and being maintained as a sorted data structure according to the hash values,
    wherein the low-level data structure contains hash values of storage blocks and the one or more higher level data structures contain some of, but not all of, the hash values in the low-level data structure that are to be used when locating hash values in the low-level data structure or adding new hash values into the low-level data structure; and
    at each host system, tracking write operations to the common storage system during a period of time and asynchronously performing deduplication operations on storage blocks that are written in connection with the write operations using the hierarchical data structure,
    wherein the low-level data structure is divided into pages including a first page and a second page, and one of the higher-level data structures that is at a next higher level than the low-level data structure contains a first hash value contained in the first page, a first pointer to the first page, a second hash value contained in the second page, and a second pointer to the second page.

2. The method of claim 1, wherein the deduplication operations include updating the low-level data structure.

3. The method of claim 2, further comprising: at each host system, prior to performing the deduplication operations, determining whether a sequential update is to be performed on the low-level data structure or a random update is to be performed on the low-level data structure.

4. The method of claim 3, wherein the sequential update is determined if the period of time is greater than a threshold value, and the random update is determined otherwise.

5. The method of claim 2, wherein the low-level data structure is updated with reference to hash values of the storage blocks that are written.

6. The method of claim 5, further comprising: determining a location within the low-level data structure associated with a storage block that is written using the one or more higher level data structures.

7. The method of claim 1, wherein some of the pages include a free space region at the end thereof.

8. The method of claim 1, further comprising:
    updating one of the pages of the low-level data structure independently of the other pages of the low-level data structure.

9. The method of claim 8, further comprising: determining whether the updating causes the page to overflow, wherein, in the case of an overflow, the updated page is divided into two parts and the first part is written into the original location of the updated page and the second part is appended to the end of the low-level data structure, and the next higher-level data structure is updated.

10. A non-transitory computer readable storage medium having stored therein instructions for causing a computer system to maintain a hierarchical data structure including a low-level data structure and one or more higher level data structures, each containing hash values and being maintained as a sorted data structure according to the hash values, and to track write operations to a storage system during a period of time and asynchronously perform deduplication operations on storage blocks that are written in connection with the write operations using the hierarchical data structure, wherein the low-level data structure contains hash values of storage blocks and the one or more higher level data structures contain some of, but not all of, the hash values in the low-level data structure that are to be used when locating hash values in the low-level data structure or adding new hash values into the low-level data structure, and wherein the low-level data structure is divided into pages including a first page and a second page, and one of the higher-level data structures that is at a next higher level than the low-level data structure contains a first hash value contained in the first page, a first pointer to the first page, a second hash value contained in the second page, and a second pointer to the second page.

11. The computer readable storage medium of claim 10, wherein the deduplication operations include updating the low-level data structure with reference to hash values of the storage blocks that are written.

12. The computer readable storage medium of claim 10, wherein the instructions further cause the computer system to determine a location within the low-level data structure associated with a storage block that is written using the one or more higher level data structures.

13. The computer readable storage medium of claim 10, wherein some of the pages include a free space region at the end thereof.

14. The computer readable storage medium of claim 10, wherein the instructions further cause the computer system to update one of the pages of the low-level data structure independently of the other pages of the low-level data structure.

15. The computer readable storage medium of claim 14, wherein the instructions further cause the computer system to determine whether the update causes the page to overflow, and wherein, in the case of an overflow, the updated page is divided into two parts and the first part is written into the original location of the updated page and the second part is appended to the end of the low-level data structure, and the next higher-level data structure is updated.

16. A computer system comprising:

a plurality of host systems connected to a common storage system, wherein each host system is programmed to track, via one or more processors, write operations to the common storage system during a period of time and asynchronously perform deduplication operations on storage blocks that are written in connection with the write operations using a hierarchical data structure that is stored in the common storage system, wherein the hierarchical data structure includes a low-level data structure and one or more higher level data structures, each containing hash values and being maintained as a sorted data structure according to the hash values, the low-level data structure containing hash values of storage blocks and the one or more higher level data structures containing some of, but not all of, the hash values in the low-level data structure that are to be used when locating hash values in the low-level data structure or adding new hash values into the low-level data structure, and wherein the low-level data structure is divided into pages including a first page and a second page, and one of the higher-level data structures that is at a next higher level than the low-level data structure contains a first hash value contained in the first page, a first pointer to the first page, a second hash value contained in the second page, and a second pointer to the second page.

17. The computer system of claim 16, wherein some of the pages include a free space region at the end thereof.

* * * * *